United States Patent [19]
Vu

[11] Patent Number: 6,021,189
[45] Date of Patent: Feb. 1, 2000

[54] SYSTEM FOR CONTROLLING USAGE OF PHONE DEBIT CARDS

[75] Inventor: Joe Q. Vu, Plano, Tex.

[73] Assignee: Northern Telecom Limited, Canada

[21] Appl. No.: 08/957,829

[22] Filed: Oct. 27, 1997

Related U.S. Application Data

[60] Provisional application No. 60/051,406, Jul. 1, 1997.

[51] Int. Cl.⁷ .......................... H04M 17/00; H04M 15/00
[52] U.S. Cl. ............................................. 379/144; 379/114
[58] Field of Search ..................................... 379/112, 114, 379/115, 144, 201, 229, 230, 196, 145; 455/405, 406, 409

[56] References Cited

U.S. PATENT DOCUMENTS

| | | | |
|---|---|---|---|
| 5,355,403 | 10/1994 | Richardson, Jr. et al. | 379/88 |
| 5,440,621 | 8/1995 | Castro | 379/112 |
| 5,469,497 | 11/1995 | Pierce et al. | 379/112 |
| 5,563,934 | 10/1996 | Eda | 379/144 |
| 5,621,787 | 4/1997 | McKoy et al. | 379/144 |
| 5,844,972 | 12/1998 | Jagadish et al. | 379/114 |

*Primary Examiner*—Curtis A. Kuntz
*Assistant Examiner*—Rexford N Barnie
*Attorney, Agent, or Firm*—Haynes and Boone, LLP

[57] ABSTRACT

Method for controlling usage of phone debit cards and an associated telephony system which incorporates the same. A switch receives requests to complete telephone calls to destination terminals and to assess fees associated with the requested telephone calls to a phone debit card account. Upon receipt of such a request, the switch asks an SCP to verify that the account is valid and has sufficient credit to complete the requested call. Upon being advised of the same, the switch completes the call. The switch then requests that the SCP deduct the cost of a first minute of the call from the account. When the switch has been advised that the cost of the first minute has been deducted from the account, the switch sets a timer. If the call is continuing when the minute expires, the switch will request that the SCP deduct the cost of the next minute from the account. The process then repeats until either the call has been released by either the originating or destination terminal or the entire value of the phone debit card has been consumed and the switch has released the call.

16 Claims, 2 Drawing Sheets

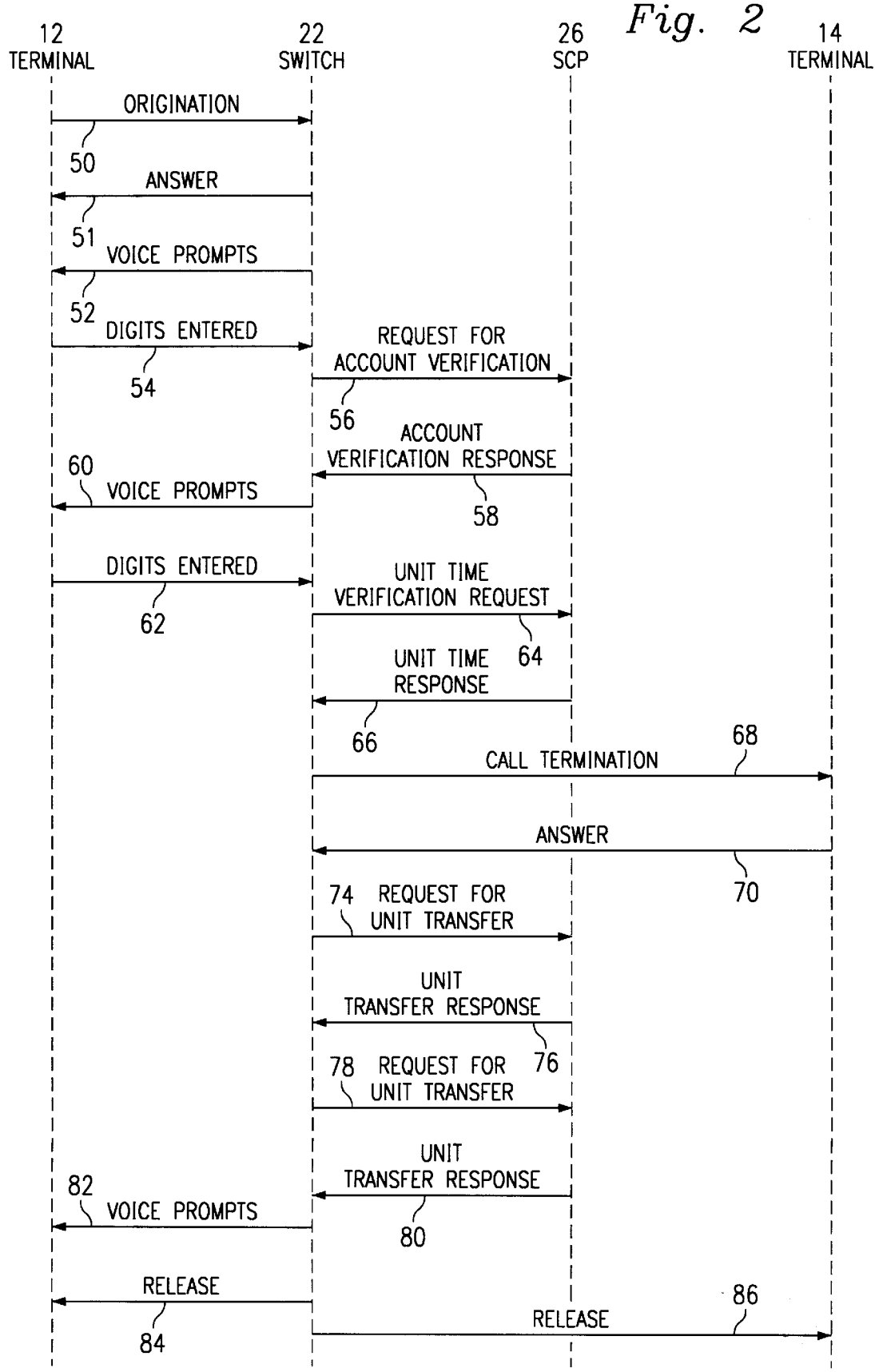

SYSTEM FOR CONTROLLING USAGE OF PHONE DEBIT CARDS

CROSS-REFERENCE TO RELATED PROVISIONAL APPLICATION

This application claims the benefit of U.S. Provisional Patent Application Ser. No. 60/051,406, filed on Jul. 1, 1997.

TECHNICAL FIELD

The invention relates generally to telephony systems and, more particularly, to a method for controlling usage of phone debit cards within the telephony system such that billing charges are properly assessed to phone debit cards.

BACKGROUND OF THE INVENTION

A prepaid calling card, also known as a phone debit card, allows users to pre-pay a selected amount of charges for telephone services, generally, charges assessed for completing telephone calls. Later, when the user makes a telephone call or otherwise incurs charges for telephone services, the charges for the provided services are deducted from the value of the card. Pre-paid phone debit cards have become increasingly popular in recent years, particularly among travelers who wish to avoid the additional expenses incurred when using calling cards which bill charges to a designated telephone number or credit card. In addition, it allows the user to both carefully monitor usage and avoid the use of unknown long distance carriers, thereby preventing the user from receiving unexpectedly large telephone bills on his or her return home.

Generally, when purchased or otherwise acquired, a phone debit card contains a number of "call units". Call units are directly related to the value of the card. For example, a one-minute domestic long distance call may cost 1 unit while a one-minute international long distance call may cost 5 units. A typical phone debit card requires the user to contact a service provider, for example, by dialing an "800" or "888" number. The service provider will ask the caller to identify themselves, typically, by providing an account number printed or otherwise recorded on the phone debit card. The service provider will review a record for the identified account which is maintained in a storage facility to determine if the phone debit card has any remaining value. If the phone debit card has remaining value, the service provider will authorize the caller to make a telephone call. The service provider will then debit the identified account for the cost of making the telephone call.

Depending on the particular technique used by a service provider to deduct units from a phone debit card, it is entirely possible that a user or users of a card may consume more units than that originally credited to the card at the time of purchase. Furthermore, since the vast majority of phone debit cards are, in effect, bearer instruments which lack any identification as to the owner of the card and are often used at public terminals, once units in excess of the pre-paid value of the phone debit card are consumed, the service provider rarely has any way of recovering the value of the additional telephone services charged to the card.

To reduce the potential for fraudulent use of telephone debit cards, some service providers has built certain restrictions into the use of their debit cards. For example, some service providers effectively prohibit multiple simultaneous users on one account by refusing, once a first user of an account has been authorized, to authorize use of the account by a second user until the first user has completed their call. However, permitting multiple simultaneous users of an account is a popular feature of phone debit cards. As a result, service providers who prohibit such uses risk losing sales to those service providers who sell phone debit cards with this feature.

In one existing technique, the user purchases, from a service provider, a phone debit card having an account number to which a specified number of call units have been credited. Later, the user dials into a switch operated by the service provider from which the user had purchased the card. The service provider searches an external database for the account. If the account has unused call units, the number of unused call units are copied from the external database to the switch. The switch then authorizes the user to begin a phone call which may continue until the user releases the call or all of the copied call units have been consumed. As the call continues, the switch will reduce its record of the number of call units remaining for the account and, when the call is released, the switch will update the external database as to the number of call units remaining for the account.

The foregoing technique also allows multiple simultaneous users of a single account. Because of this, there exists considerable potential for fraudulent use of an account. When a first user attempts to use the account, an indicator of the amount of remaining credit for the account is copied to the switch. However, the database continues to reflect the same amount of remaining credit. Thus, if a second user accesses the same account before the first user terminates his or her call and the database receives an updated value for the amount of remaining credits, the database will again advise that the account has the indicated number of credits, even though the same credits have been authorized for use by the first user. Thus, if both users consume all of the credits for which the database has authorized the switch (or switches) to allow the callers to use, the callers will have collectively used more credits than those remaining on the debit card.

Nor is fraud the only process by which the foregoing technique may cause the service provider to suffer losses. As previously stated, the external database copies the number of remaining call units to the switch and, when the call is completed, the switch will update the external database as to the number of remaining call units. If, however, the connection between the switch and the external database is lost while the call is continuing, the switch will be unable to update the external database. Since the connection between the switch and the external database is entirely separate and distinct from the connection for the call itself, the call may continue after the switch and external database have been disconnected from each other. As a result, therefore, the user may consume some or all of the remaining call units while the external database will continue to indicate, as the number of call units remaining, the original number of call units. This permits the user to consume more call units than that originally provided by the phone debit card.

SUMMARY OF THE INVENTION

The present invention, accordingly, provides a method, and associated telephony system, for controlling usage of phone debit cards when deducting call units therefrom such that the simultaneous use of an account by multiple users is permitted while certain types of fraud which are commonly associated with phone debit cards which permit multiple simultaneous users is prevented. The present invention further provides for the account to be updated with additional credits even when it is being used. Usage of the phone debit card is controlled by the combination of a switch which receives requests, from originating terminals, to complete telephone calls to destination terminals and to assess fees associated with the requested telephone calls to phone debit card accounts and a database system which maintains information regarding the service provider's fee schedule for telephone calls and the remaining value, if any, for phone debit card accounts issued by the service provider.

In accordance with the teachings of the present invention of a method for controlling usage of phone debit cards, the switch periodically receives an account number for a phone debit card from an originating terminal. The switch transmits a message to the database system requesting that the database system verify the account number. Upon receiving a reply message indicating that the account corresponding to the received account number is valid, the switch issues a prompt to the originating terminal requesting a telephone number to be called. Upon receiving the telephone number, the switch transmits another message to the database system, here, requesting that the database system verify that the account has sufficient credit to complete a call to the requested telephone number. Upon receiving another reply message, here, one that indicates that the account has sufficient credit to complete the call, the switch completes the call to a destination terminal associated with the telephone number. When connection with the destination terminal has been completed, the switch transmits yet another message to the database system, here, requesting that the database system deduct a selected value from said account which corresponds to the fees assessed with a first time unit for the on-going telephone call. Upon receiving yet another reply message from the database system, here, a message confirming that the requested value has been deducted from the account, the switch sets a timer to begin a countdown of the time unit. Upon completion of the countdown, the steps of the switch issuing a request that the database system deduct the selected value from the account, the database system deducting the requested value from the account, the database system advising the switch that the requested value has been deducted and the switch resetting the countdown repeats until either the originating or destination terminal releases the call or until the entire value of the account is used. In this case, the switch would release the call.

BRIEF DESCRIPTION OF THE DRAWINGS

FIG. 1b is a enlarged block diagram of the switch and the database system of FIG. 1a.

FIG. 2 is a flow chart of a method by which usage of a phone debit card may be controlled to reduce the potential for fraudulent use thereof.

DESCRIPTION OF A PREFERRED EMBODIMENT

Figure 1A:
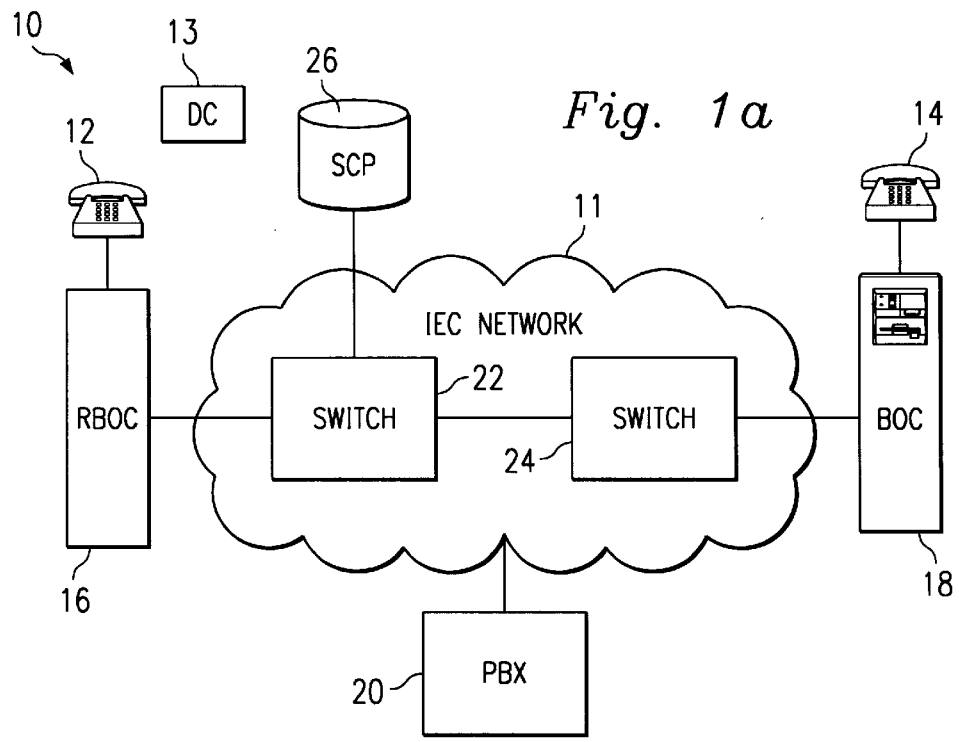
FIG. 1a is a block diagram which illustrates a telephony system which includes a phone debit card usage control system embodying features of the present invention.

Turning now to the drawings, in FIG. 1a, the reference numeral 10 designates a telephony system which includes an interexchange carrier (or "IEC") network 11. Voice terminals, for example, telephones 12 and 14, are coupled to the IEC network 11 by respective local exchange carriers (or "LEC"s), for example, regional Bell operating companies (or "RBOCs") 16 and 18. Of course, voice terminals may also be coupled to the IEC network 11 by a private branch exchange (or "PBX") such as PBX 20. The telephony system 10 includes a series of switching nodes 22, 24, which, for example, may be switches such as the DMS-250 switch manufactured by Nortel, for directing calls between originating and destination telephones 12 and 14. Also coupled to the telephony system is a service control point (or "SCP") 26 which, as more fully described below, is a system, including a database, which, in combination with the switch 22, controls the use of phone debit cards. Of course, the IEC network 11 has been greatly simplified and various components thereof have been omitted for ease of illustration.

Figure 1B:
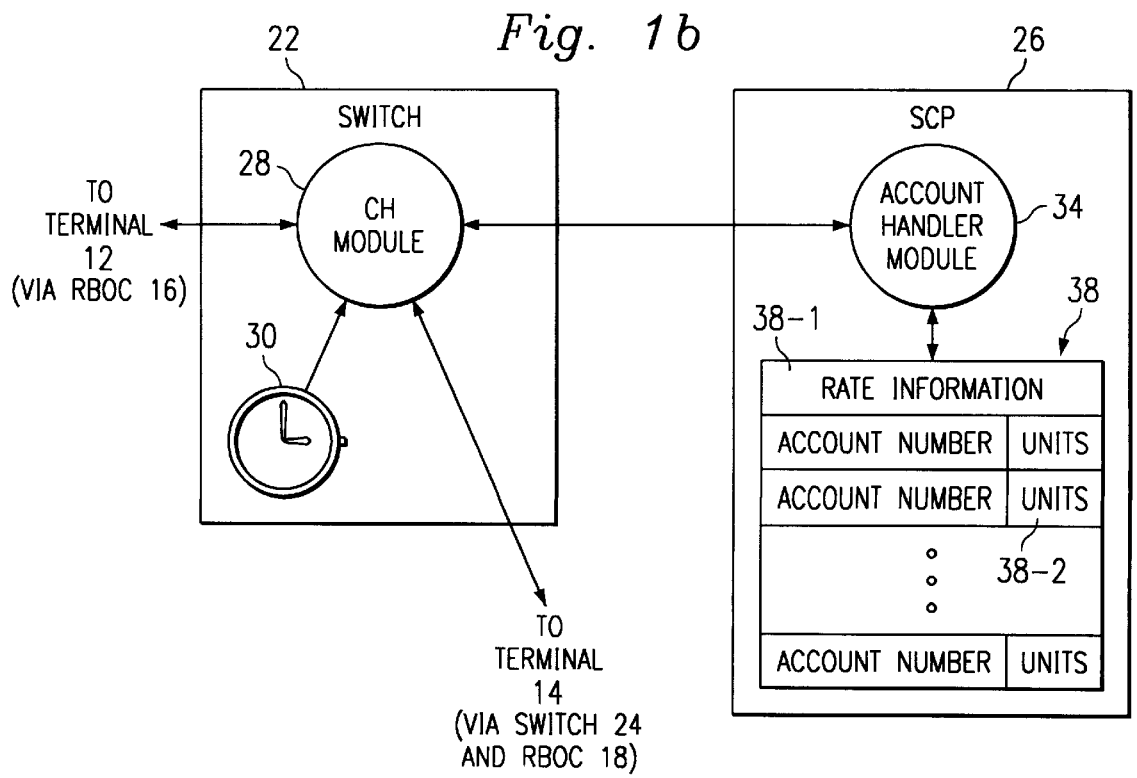

Referring next to FIG. 1b, the switch 22 and the SCP 26 are now shown in greater detail. Again, however, the switch 22 and the SCP 26 have been greatly simplified and that various components thereof have been omitted for ease of illustration. The switch 22 includes a call handler (or "CH") module 28 which handles exchanges between the RBOC 16, the switch 24 and the SCP 26 when a telephone call is initiated by the terminal 12 using a phone debit card 13 and a timer 30, for example a real time clock, which monitors the duration of a telephone call for the CH module 28.

The SCP 26 includes an account handler module 34 and a memory subsystem 38. The account handler module 34 handles requests for account information received from the switch 22, retrieves the requested account information from the memory subsystem 38 for transmission to the switch 22 and updates account information in the memory subsystem 38. Preferably, the account handler module 34 is a software module which resides in a computer system forming part of the SCP 26 and is executable by a processor subsystem thereof.

Referring next to FIG. 2, a method of controlling usage of a phone debit card in accordance with the teachings of the present invention shall now be described in greater detail. The method commences at step 50 by a user initiating a request for connection with a service provider which has issued the phone debit card (or "DC") 13. For example, the user may dial an "800" or "888" number printed on the phone debit card 13. The request for connection to the service provider is received by the switch 22 which, in many cases, is owned by the service provider issuing the phone debit card 13. Upon detection of the request for connection to the service provider, at step 51, the switch 22 completes the connection to the service provider and, at step 52, the switch 22 issues a voice prompt to the terminal 12 requesting that the user provide the number of an account to which the long distance calls are to be charged.

Proceeding to step 54, the user replies by providing an account number to which the long distance calls are to be charged. It is contemplated that user may provide the switch 22 with the requested account number by way of a variety of techniques. For example, the user may depress digits on the keypad of the terminal 12 which correspond with an account number printed on the phone debit card 13. Alternately, the account number may be encoded on a magnetic strip provided on the phone debit card 13. Here, the user could simply "swipe" the phone debit card 13 through a reader provided as part of the terminal 12. While, in the disclosed embodiment of the invention, the switch 22 requests only an account number, as an additional security measure, the switch 22 could also request a personal identification number (or "PIN") which, for example, may be selected during purchase of the phone debit card 13.

Proceeding to step 56, upon receipt of the account number, the switch 22 contacts the SCP 26 to verify the account number provided by the user. The SCP 26 maintains, in a second portion 38-2 of the memory subsystem 38, a list of all of the account numbers issued by the service provider and the number of units credited to that account number. The account handler 34 receives the verification request from the CH module 28 and searches the second portion 38-2 of the memory subsystem 38 for a matching account number. If a matching account number is found, the account handler module 34 retrieves the number of units credited to that account number for transmission to the switch 22 for storage in memory (not shown) associated therewith. Accordingly, at step 58, the account handler module 34 of the SCP 26 issues a response to the request for account verification. If no match is found, the account handler module 34 issues a message indicating that it is unable to verify the account. If, however, a match is found, the account handler module 34 issues a message that indicates that the account is verified. The message will also contain the number of credits for the account.

Continuing on to step 60, upon receipt of a response to the request for account verification, the CH module 28 of the switch 22 will issue a voice prompt to the terminal 12. Again, the particular voice prompt issued will vary depending on the type of response received from the SCP 26. If the SCP was unable to verify the account number, the CH module 28 will issue a message indicating that it is unable to identify the account number and asks that the user re-enter another account number. The method would then return to step 54 where the switch 22 awaits another account number. If, however, the message received by the CH module 28 indicates that the account handler module 34 was able to identify the account number but that the account has no credits remaining, the voice prompt issued by the CH module would indicate that the account has no credits remaining and ask that the user either hang-up or enter another account number. The method would then return to step 54 where the switch 22 would again await another account number. If desired, the CH module 28 may maintain a response count where, if the user unsuccessfully attempts to enter an account number a preselected number of times, for example, three, the CH module 28 would issue a voice prompt asking that the user call back later and then automatically release the connection between the terminal 12 and the switch 22.

If, however, the message received by the CH module 28 indicates that the account handler module 34 was able to identify the account number and that the account number has call units remaining, the voice prompt issued by the CH module 28 would advise the user of the number of call units remaining. The voice prompt would ask the user to enter the telephone number to be called. Proceeding on to step 62, the switch 22 awaits a telephone number to be entered at the terminal 12 by the user. If desired, the CH module 28 may maintain a time count where, if the user fails to enter a telephone number in a preselected time period, for example, one minute, the CH module 28 automatically issues a voice prompt advising the user that they have failed to comply with the request for a telephone number and then releases the connection between the terminal 12 and the switch 22.

Continuing on to step 64, upon receipt of a telephone number entered into the terminal 12 by the user, the CH module 28 issues a unit time verification request. More specifically, while the switch 22 had been previously advised of the number of call units credited to the account number, the switch 22 is unable to determine if the user has sufficient call units for the requested call. Accordingly, the CH module 28 asks the SCP 26 to make this determination. The CH module 28 transmits the telephone number for the terminal 12, together with the telephone number of the destination terminal 14 to be called, to the account handler module 34 of the SCP 26. The account handler module 34 would determine the rate for the requested call using the provided telephone numbers, together with rate information stored in a first portion 38-1 of the memory subsystem 38. For example, while the value for the phone debit card 13 is determined as number of call units with each call unit having a cash value, for example, $1.00, different calls will consume call units at different rates. For example, the rate for a domestic call may be 1 call unit per minute, the rate for a call to Europe may be 3 call units per minute and the rate for a call to Japan may be 5 call units per minute.

Proceeding to step 66, the account handler module 34 of the SCP 26 issues a unit time response to the CH module 28 of the switch 22. The next action taken by the CH module 28 will vary depending on the response received from the account handler module 34 of the SCP 26. If the account number has insufficient call units to pay for the first minute of the call, the CH module 28 will issue a voice prompt to the terminal 12 to advise the user that there are insufficient credits to complete the requested call and asking the user to hang-up or enter another telephone number. The method would then return to step 62 to await a next telephone number from the terminal 12. If, however, the account has sufficient credits to complete the call, the method proceeds to step 68 for call termination. In the rare instance where the user has sufficient credits for only the first minute of the call, the CH module 28 would issue a voice prompt to the terminal 12 indicating that the call is being completed but that there are only sufficient call units to pay for the first minute of the call. The method would then proceed on to step 68 for call termination.

At step 68, the CH module 28 of the switch 22 completes the call to the destination terminal 14 in accordance with conventional call handling techniques. For example, the call may be completed by way of the switch 24 and the RBOC 18. The particular path of the connection will vary depending on factors such as where the terminal 14 interconnects into the telephony system 10 and usage of the telephony system 10 at the time the call handler module 28 attempts completion of the call. Proceeding on to step 70, the terminal 14 answers, for example, by lifting a receiver portion thereof. Upon the switch 22 receiving notification of an answer by the terminal 14, the connection between the terminal 12 and the terminal 14 is completed.

The method then continues on to step 74 where the CH module 28 of the switch 22 issues a unit transfer request to the account handler module 34 of the SCP 26. By issuing a unit transfer request, the switch 22 is requesting that a portion of the call units associated with the phone debit card 13 be transferred to the switch 22 to pay charges associated with the call completed thereby. For example, the format of the unit transfer request may be configured as set forth in Table I, below.

TABLE I

| Account No. | Calling No. | Called No. | Requested Units |
|---|---|---|---|

The unit transfer request includes first, second, third and fourth fields. The first field contains the account number provided by the user and previously verified by the SCP 26. The second field contains the originating telephone number for the completed call. The third field contains the destination telephone number for the completed call. Finally, the fourth field contains the number of call units for which the CH module 28 is requesting the transfer thereof to the switch 22. While, in various embodiments of the invention, the CH module 28 may be configured to use various types of criteria to determine the requested number of units, typically, the CH module 28 will request the number of units required to pay for one minute of connection time for the completed call. In other words, the request will match the response to the request for unit time verification received by the CH module 28 of the switch 22 in step 66. For example, if the completed call costs 5 call units per minute of connect time, the CH module 28 of the switch 22 will request the transfer of 5 call units.

Proceeding on to step 76, the account handler module 34 responds to the unit transfer request by accessing the entry in the second portion 38-2 of the memory 38 which corresponds to the account number contained in the first field of the unit transfer request in order to determine if the account has sufficient units credited thereto so that the requested number of units may be transferred. If the number of units credited to the account are equal to or greater than the number of units requested by the CH module 28 of the switch 22, the account handler module 34 modifies the accessed entry in the second portion 38-2 of the memory by subtracting the requested number of units from the credited units. The account handler module 34 then generates a reply message which, for example, may be formatted in accordance with the configuration set forth in Table II, below.

TABLE II

| Account No. | Units Transferred | Units Remaining |
| --- | --- | --- |

The reply message includes first, second and third fields. The first field contains the account number provided by the user, verified by the SCP 26 and retransmitted to the account handler module 34 of the SCP 26 as part of the unit transfer request. The second field contains the number of units transferred to the CH module 28 of the switch 22. In most cases, the units transferred will match the number of units requested for transfer which was contained in the fourth field of the unit transfer request. Finally, the third field contains the total number of units credited to the account after the number of units transferred has been deducted therefrom. The reply message is then transmitted to the CH module 28 of the switch 22 at step 80.

In the event, however, that the number of units requested for transfer to the CH module 28 of the switch 22 exceeds or is equal to the number of call units credited to the account, the account handler module 34 will transfer all of the remaining units to the call handler module 28 of the switch 22 and the method will proceed as described above, except that the number of units transferred to the call handler module 28 of the switch 22 will be the total number of call units credited to the phone debit card 13. However such a result is not expected to occur except in the unlikely scenario that a second call (not shown in FIG. 2) to be charged to the same account number is completed after the switch 22 has received the unit time response at step 66 but before the SCP 26 has received the request for unit transfer at step 74.

Upon receipt of the reply message, the CH module 28 instructs the timer 30 to initiates a one minute countdown. The two-way voice connection will continue until released by the originating terminal 12, the destination terminal 14 or the CH module 28 of the switch 22. Release by the terminals 12 and 14 are caller and callee controlled, may occur at any time, and are, therefore, not shown in FIG. 2. If either the caller or callee release the call before the timer 30 has completed its countdown of the first minute of the call, the method will end without any additional steps being necessary. If, however, the one-minute timeout countdown expires without either the terminals 12 or 14 having released the call, the CH module 28 will proceed to step 78 where the CH module 28 of the switch 22 will initiate another request for unit transfer identical to the one previously generated. The steps of the CH module 28 issuing a next request for unit transfer, the account handler module 34 deducting the requested units from the corresponding entry in the second portion 38-2 of the memory 38, the account handler module 34 transmitting a reply message containing the units transferred and the units remaining and the CH module 28 of the switch 22 resetting the timer 30 for a next one-minute timeout countdown will repeat until one of the terminals 12 or 14 release the call or until either (a) the number of remaining call units credited to the account, as indicated in the third field of the reply message, is either equal to zero or is less than the number of transferred units (as indicated in the second field of the reply message); or (b) until the number of call units transferred to the CH module 28 of the switch 22, as indicated in the second field of the reply message, is less than the number of call units requested by the CH module 28 of the switch 22. Of course, this last scenario may only occur when two or more users are using the same account.

If the third field of the reply message indicates that the number of call units remaining is either equal to zero or is less than the number of transferred units, the method proceeds to step 82 where the CH module 28 of the switch 22 issues a voice prompt to the terminal 12 to advise the user that there is only one minute remaining in the call. Upon the timer 30 indicating to the CH module 28 that the one-minute timeout countdown has expired, the CH module 28 of the switch 22 releases the terminal 12 at step 84 and releases the terminal 14 at step 86. Having released the terminals 12 and 14, the method ends without any further steps being necessary.

In an alternate embodiment of the invention, the CH module 28 of the switch 22 will proceed to step 82 for issuance of the "one-minute warning" upon determining that the number of remaining call units is less than the number of transferred call units. When this condition occurs, the CH module 28 knows that, the next time that a request for unit transfer is issued for the on-going call, the SCP 26 will be unable to transfer the requested number of call units. However, while issuing the voice prompt when the call units remaining drops below the call units transferred will prevent the switch 22 from suffering any loss of revenue, this approach may be less desirable since, by automatically disconnecting the user, the switch 22 implies that there are no more call units credited to the phone debit card 13 when, depending on the rate of transfer of call units to the switch 22, there may, in fact, still be call units credited to the phone debit card 13. Thus, it may be desirable to some service providers to absorb the occasional loss to avoid suggesting to users that a phone debit card with credits remaining is used up.

Returning to step 82, a voice prompt will also be issued if the number of units transferred to the switch (as indicated in the second field of the reply message) is less than the requested number of units (as indicated in the fourth field of the transfer request). Such a result may occur in two scenarios. First, if the previously described voice prompt which is issued due to insufficient call units remaining credited to the account is issued when the remaining call units is equal to zero, an insufficient credit condition may occur, depending on the starting number of call units, if call units are deducted at rates greater than 1 unit per minute.

Second, if another user accesses the same account between consecutive requests for transfer of call units by the CH module 28 of the switch 22 and the account handler module 34 of the SCP 26 transfers call units in response to a request by a switch servicing the second user, depending on the rate at which the first user is consuming call units and the number of call units transferred on behalf of the second user, an insufficient credit condition may result for the first user.

Upon occurrence of an insufficient credit condition, the CH module 28 of the switch 22 will issue a voice prompt at step 82. Typically, the voice prompt will contain an audible message that will advise the user that there are insufficient call units remaining in their account to continue the call. Upon delivery of the voice prompt to the originating terminal 12, the CH module 28 of the switch 22 will then release the originating terminal 12 at step 84 and the destination terminal 14 at step 86. The method will then end without further steps being necessary. As some service providers may disfavor the disconnection of users without warning, in an alternate embodiment of the invention, the voice prompt issued at step 82 may be an audible message advising the user that all of the call units credited to the phone debit card 13 have been consumed and that there is only one minute remaining before the call is disconnected. The CH module 28 of the switch 22 would then initiate another one-minute timeout countdown using the timer 30 and, upon expiration of the countdown, proceed with the release of the originating and destination terminals 12 and 14 at steps 84 and 86, respectively. While it is possible that, in this alternative embodiment of the invention, some phone services will be provide without compensation, some service providers may believe the loss of revenue is worth avoiding the disconnection of their customers without sufficient notice that will allow the user to complete their telephone call.

It should be noted that the disclosed method for controlling usage of a phone debit card also permits an account to be updated with additional credits even when it is being used in accordance with the above-described technique. Specifically, in addition to transferring units to the switch 22 by modifying an entry in the second portion 38-2 of the memory to subtract a requested number of units from the credited units, the account handler 34 may also, in response to an appropriate request issued by the switch 22, access an entry in the second portion 38-2 of the memory to increase the number of credited units recorded thereat.

Although illustrative embodiments of the invention have been shown and described, other modifications, changes, and substitutions are intended in the foregoing disclosure. For example, in accordance with the teachings of the present invention, call units are transferred to the CH module 28 of the switch 22, no such transfer need occur. Instead, the CH module may simply be advised that the requested number of call units have been deducted from the appropriate account. Accordingly, it is appropriate that the appended claims be construed broadly and in a manner consistent with the scope of the invention.

What is claimed is:

1. A method of controlling usage of a phone debit card, comprising the steps of:

receiving, at a switch, an account number for a phone debit card;

said switch transmitting a message, to a database system which maintains an account corresponding to said account number, requesting that said database system verify said account number;

upon receiving a message from said database system verifying said account, said switch issuing a voice prompt, to an originating terminal which provided said account number, requesting a telephone number to be called;

upon receiving said telephone number, said switch transmitting a message to said database system requesting that said database system verify that said account has sufficient credit to complete a call to said telephone number;

upon receiving a message from said database system verifying that said account number has sufficient credit to complete said call, said switch completing said call to a destination terminal associated with said telephone number;

upon completing a connection with said destination terminal, said switch transmitting a message to said database requesting that said database system deduct a selected value from said account;

receiving, at said switch, a message from said database system indicating that a value had been deducted from said account and reporting remaining credit for said account after deduction of said value; and said switch selecting a call continuation process based upon said value deducted from said account and said reported remaining credit for said account.

2. The method of claim 1 and further comprising the steps of:

upon receiving said request to verify said account number, verifying, at said database system, said account number received from said switch, by comparing said account number to a series of records, each corresponding to an account, maintained in memory at said database system:

if said received account number matches one of said account records maintained in memory at said database system, said database system examining said matching record to determine if said account has any remaining credit;

if said account has credit remaining, said database system issuing a message to said switch verifying said account number.

3. The method of claim 2 and further comprising the steps of:

upon receiving said credit verification request from said switch, said database system examining said request to determine an originating telephone number and said telephone number to be called;

said database system determining a fee per time unit to complete said requested call;

said database system examining said matching record to determine if said account has sufficient credit to pay said fee for a first time unit of said requested call; and if said account has sufficient credit to pay said fee, said database system issuing a credit verification message to said switch.

4. A telephony system, comprising:

a switch, said switch including a call handler module for completing calls and for receiving requests to assess fees, associated with said calls, to phone debit card accounts; and an account handler module, coupled to said switch, for verifying:

(1) that phone debit card accounts identified by said call handler module have value:

(2) that phone debit card accounts identified by said call handler module have sufficient value to pay fees assessed for completing requested telephone calls for a duration of one time unit;

(3) that phone debit card accounts identified by call handler module have insufficient value to pay fees assessed for completing said requested telephone calls for said one time unit; and for indicating:

(1) an amount deducted in response to a request by said call handler module to deduct a fee for completing one time unit of a telephone call; and (2) a remaining value after deduction of said amount:

upon completion of a connection for a call to be charged to said phone debit card account, said call handler module issuing a request to said account handler module to deduct said fee from said phone debit card account;

said account handler module issuing a reply to said call handler indicating said amount deducted and said remaining value for said phone debit card account;

said call handler module selecting a call continuation process based upon said amount deducted and said remaining value for said phone debit card account.

5. The method of claim 1 wherein the step of said switch selecting a call continuation process based upon said value deducted from said account and said reported remaining credit for said account further comprises the step of:

if said message indicates that said deducted value matches said selected value and that said reported remaining credit for said account is equal to or exceeds said deducted value, said switch selecting a first call continuation process comprising the steps of initiating a countdown of a selected time period and, upon expiration of said selected time period, said switch issuing a next request, to said database system, to deduct said selected value from said account.

6. The method of claim 5 wherein the step of said switch selecting a call continuation process based upon said value deducted from said account and said reported remaining credit for said account further comprises the step of:

if said message indicates that said deducted values matches said selected value but that said reported remaining credit for said account is less than said deducted value, said switch selecting a second call continuation process comprising the steps of initiating a countdown of a selected time period and, upon expiration of said selected time period, said switch releasing said call.

7. The method of claim 6 and further comprising the step of:

upon determining that said reported remaining credit for said account is less than said deducted value, said switch issuing, to said caller, a voice prompt indicating that said call will continue for said selected time period.

8. The method of claim 6 wherein the step of said switch selecting a call continuation process based upon said value deducted from said account and said reported remaining credit for said account further comprises the step of:

if said message indicates that said deducted value is less than said selected value and said remaining credit is less than said deducted value, said switch selecting a third call continuation process comprising the step releasing said call.

9. The method of claim 6 wherein the step of said switch selecting a call continuation process based upon said value deducted from said account and said reported remaining credit for said account further comprises the step of:

if said message indicates that said deducted value is less than said selected value and said reported remaining credit for said account is less than said deducted value, said switch selecting a third call continuation process comprising the steps of initiating a countdown of a selected time period and, upon expiration of said selected time period, said switch releasing said call.

10. The method of claim 9 and further comprising the step of:

upon determining that said reported remaining credit for said account is less than said deducted value, said switch issuing, to said caller, a voice prompt indicating that said call will continue for said selected time period.

11. A method of controlling usage of a phone debit card, comprising the steps of:

receiving, at a switch, an account number for a phone debit card and a telephone number to be called;

said switch completing a connection between an originating terminal which provided said account number and a destination terminal associated with said telephone number;

upon completing said connection, said switch transmitting a message, to a database system which maintains an account corresponding to said account number, requesting that said database system deduct a selected value from said account;

said switch selecting a call continuation process based upon a reply message, received from said database system, indicating a value deducted from said account by said database system and reporting remaining credit for said account after deduction of said value.

12. The method of claim 11 wherein the step of said switch selecting a call continuation process based upon a reply message further comprises the steps of:

if said reply message indicates that said deducted value matches said selected value and that said remaining credit for said account is equal to or exceeds said deducted value, said switch selecting a first call continuation process comprising the steps of initiating a countdown of a selected time period and reissuing said request when said countdown expires;

if said reply message indicates that said deducted value matches said selected value and that said remaining credit is less than said deducted value, said switch selecting a second call continuation process comprising the steps of initiating said countdown of said selected time period and releasing said call when said countdown expires;

if said reply message indicates that said deducted value is less than said selected value and that said remaining credit is less than said deducted value, said switch selecting a third call continuation process comprising the step of releasing said call.

13. The method of claim 12 when said second call continuation process further comprises the step of issuing a voice prompt to said caller indicating that said call will continue for said selected time period and then be released.

14. The method of claim 11 wherein the step of selecting a call continuation process based upon a reply message further comprises the steps of:

if said reply message indicates that said deducted value matches said selected value from said account and that said remaining credit is equal to or exceeds said deducted value, said switch selecting a first call continuation process comprising the steps of initiating a countdown of a selected time period and reissuing said message when said countdown expires;

if said reply message indicates that said deducted value matches said selected value and that said remaining credit is less than said deducted value, said switch selecting a second call continuation process comprising the steps of initiation said countdown of said selected time period and releasing said call when said countdown expires; and if said reply message indicates that said deducted value is less than said selected value and said remaining credit is less than said deducted value, said switch selecting said second call continuation process.

15. The method of claim 14 when said second call continuation process further comprises the step of issuing a voice prompt to said caller indicating that said call will continue for said selected time period and then be released.

16. The system of claim 4 wherein said call handler module further comprises:

means for selecting a first call continuation process comprised of the steps of initiating, using a timer coupled to said call handler module, a countdown of a selected time period and reissuing said request when said countdown expires if said reply message indicates that said deducted value matches said selected value and that said remaining credit for said account is equal to or exceeds said deducted value;

means for selecting a second call continuation process comprised of the steps of initiating, using said timer, said countdown of said selected time period and releasing said call when said countdown expires if said reply message indicates that said deducted value matches said selected value and that said remaining credit for said account is less than said deducted value;

means for selecting a third call continuation process comprised of the step of releasing said call if said reply message indicates that said deducted value is less than said selected value and that said remaining credit is less than said deducted value.

* * * * *